(12) United States Patent
Xu et al.

(10) Patent No.: US 9,787,618 B2
(45) Date of Patent: Oct. 10, 2017

(54) CONTENT-CENTRIC NETWORK COMMUNICATION METHOD AND APPARATUS

(71) Applicant: Samsung Electronics Co., Ltd., Suwon-si, Gyeonggi-do (KR)

(72) Inventors: Jiangwei Xu, Suwon-si (KR); Sang-Jun Moon, Seoul (KR); Yong-Seok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 14/108,614

(22) Filed: Dec. 17, 2013

(65) Prior Publication Data

US 2014/0181226 A1    Jun. 26, 2014

(30) Foreign Application Priority Data

Dec. 21, 2012   (KR) ........................ 10-2012-0150311

(51) Int. Cl.
*H04L 12/58*  (2006.01)
*H04L 12/18*  (2006.01)

(52) U.S. Cl.
CPC .......... *H04L 51/14* (2013.01); *H04L 12/1859* (2013.01); *H04L 12/1886* (2013.01)

(58) Field of Classification Search
CPC .. H04L 51/14; H04L 12/1859; H04L 12/1886
See application file for complete search history.

(56) References Cited

U.S. PATENT DOCUMENTS

| | | | | |
|---|---|---|---|---|
| 6,505,249 B1* | 1/2003 | Rehkopf | ................. | H04L 29/06 702/182 |
| 6,513,024 B1* | 1/2003 | Li | ........................ | G06N 99/005 706/13 |
| 6,668,340 B1* | 12/2003 | Baker | ................. | G06F 11/3688 714/26 |
| 8,924,352 B1* | 12/2014 | Andruss | .............. | G06F 11/1461 707/640 |
| 2002/0138443 A1* | 9/2002 | Schran | ................. | G06Q 20/382 705/64 |
| 2004/0044992 A1* | 3/2004 | Muller | ................ | G06F 11/3684 717/124 |

(Continued)

OTHER PUBLICATIONS

U.S. Appl. No. 14/127,946, Wuji Chen.*

*Primary Examiner* — Philip Chea
*Assistant Examiner* — Wuji Chen
(74) *Attorney, Agent, or Firm* — Jefferson IP Law, LLP

(57) ABSTRACT

A Content Centric Network (CCN) communication method and an apparatus are provided. The method includes managing a Forwarding Information Base (FIB) indicating destinations to forward an interest message that requests content, which is performed by a CCN node, wherein the FIB includes at least one of a name prefix field indicating a content name, a face list field indicating destinations to forward an interest that requests content with the content name, and a congestion impact field indicating a relative time taken to receive the content from a corresponding destination in response to the interest message, receiving a first interest message, and forwarding the first interest message to at least one destination node determined by taking into account the congestion impact field.

16 Claims, 14 Drawing Sheets

(56) References Cited

U.S. PATENT DOCUMENTS

| | | | |
|---|---|---|---|
| 2004/0044993 A1* | 3/2004 | Muller | G06F 11/3684 717/124 |
| 2004/0128651 A1* | 7/2004 | Lau | G06F 11/3664 717/124 |
| 2005/0015641 A1* | 1/2005 | Alur | G06F 11/1458 714/2 |
| 2007/0067587 A1* | 3/2007 | Rossi | G06F 11/1461 711/162 |
| 2007/0143827 A1* | 6/2007 | Nicodemus | G06F 21/6218 726/2 |
| 2008/0059610 A1* | 3/2008 | Lin | G06F 9/5061 709/220 |
| 2008/0086719 A1* | 4/2008 | Clemenceau | G06F 9/44505 717/121 |
| 2008/0183309 A1* | 7/2008 | Beers | G06F 9/4411 700/17 |
| 2009/0092124 A1* | 4/2009 | Singhal | H04L 67/104 370/351 |
| 2010/0094950 A1* | 4/2010 | Zuckerman | H04L 67/1008 709/213 |
| 2010/0146514 A1* | 6/2010 | Alexander | G06F 11/3688 718/104 |
| 2010/0195655 A1* | 8/2010 | Jacobson | H04L 45/748 370/392 |
| 2011/0066708 A1* | 3/2011 | Schran | G06Q 20/382 709/221 |
| 2011/0090908 A1* | 4/2011 | Jacobson | H04L 45/745 370/392 |
| 2013/0019242 A1* | 1/2013 | Chen | H04L 41/145 718/1 |
| 2013/0035909 A1* | 2/2013 | Douady | 714/37 |
| 2013/0219081 A1* | 8/2013 | Qian | H04L 67/327 709/241 |
| 2013/0227048 A1* | 8/2013 | Xie | H04L 67/327 709/213 |
| 2013/0282860 A1* | 10/2013 | Zhang | H04L 45/306 709/217 |
| 2014/0279922 A1* | 9/2014 | Kottomtharayil | G06F 9/505 703/2 |

* cited by examiner

Pending Interest Table (PIT)

| Name (802) | Incoming Face (804) | Transmit Time (806) |
|---|---|---|
| ccnx://vcall/session1 | 13.42.11.41 : 5434 | 2012-06-12 12:32:12.142 |
| ccnx://youtube/video1 | 111.213.1.3 : 4234 | 2012-06-12 12:31:44.416 |
| ccnx://chatting/room73 | 17.133.1.33 : 7521 | 2012-06-12 12:31:32.412 |

CONTENT-CENTRIC NETWORK COMMUNICATION METHOD AND APPARATUS

CROSS-REFERENCE TO RELATED APPLICATION(S)

This application claims the benefit under 35 U.S.C. §119(a) of a Korean patent application filed on Dec. 21, 2012 in the Korean Intellectual Property Office and assigned Ser. No. 10-2012-0150311, the entire disclosure of which is hereby incorporated by reference.

TECHNICAL FIELD

The present disclosure relates to a network communication system. More particularly, the present disclosure relates to a method and apparatus for handling and delivering content in a content-centric network.

BACKGROUND

Internet Protocol (IP) based data networks have many challenges in bandwidth restriction, low reliability, low availability, expensive cost, high demand for huge storage sectors, etc. To address such challenges, a Content Centric Network (CCN) has been developed. The CCN introduces new approaches to a network structure by delivering a request for content instead of an address of a host server.

CCN Communications are performed in a receiver-controlled method. A user who wants to perform data communication sends an interest message to another party via an available connection. Upon reception of the interest message, the other party, who owns data that matches or satisfies requirements for specifications included in the interest message, may send a matching content object in a reply to the user. The reply to the interest message should only include the data. In order to reach as many potential data sources having minimum bandwidth costs as possible, the interest message may be sent using broadcast or multicast functions on an underlying transport layer.

A Forwarding Information Base (FIB) used in the CCN is a table of destinations of the interest messages, configured to detect content names by performing the longest prefix matching within each CCN node. Each prefix entry in the FIB may represent a list of destinations rather than a single destination. A Pending Interest Table (PIT) stores records of the interest messages having been received by matching them with their content names.

When large-sized content is sent over the CCN using a related-art FIB, there is the problem of wasting link traffic and caches on the links. In addition, if link speeds between nodes are significantly different, link traffic is also wasted and content delivery speed becomes slower.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for preventing an interest message being sent on congestion links in a Content Centric Network (CCN).

Another aspect of the present disclosure is to provide a method and apparatus for canceling delivery of unnecessary content in a CCN.

Another aspect of the present disclosure is to provide a method and apparatus for reducing data traffic on network links while improving network link usage rates in a CCN.

Another aspect of the present disclosure is to provide a method and apparatus for delivering content using a Forwarding Information Base (FIB) to which a congestion impact field is added.

Another aspect of the present disclosure is to provide a method and apparatus for delivering content using a Pending Interest Table (PIT) that includes transfer times of interest messages.

In accordance with an aspect of the present disclosure, a CCN communication method is provided. The CCN communication method includes managing a FIB indicating destinations to forward an interest message that requests content, which is performed by a CCN node, wherein the FIB includes at least one of a name prefix field indicating a content name, a face list field indicating destinations to forward an interest message that requests content with the content name, and a congestion impact field indicating a relative time taken to receive the content from a corresponding destination in response to the interest message, receiving a first interest message, and forwarding the first interest message to at least one destination node determined by taking into account the congestion impact field.

In accordance with another aspect of the present disclosure, a CCN communication apparatus is provided. The CCN communication apparatus includes a controller configured to manage a FIB indicating destinations to forward an interest message that requests content, wherein the FIB includes at least one of a name prefix field indicating a content name, a face list field indicating destinations to forward an interest message that requests content with the content name, and a congestion impact field indicating a relative time taken to receive the content from a corresponding destination in response to the interest message, and a communication unit configured to receive a first interest message and configured to forward the first interest message to at least one destination node determined by taking into account the congestion impact field.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
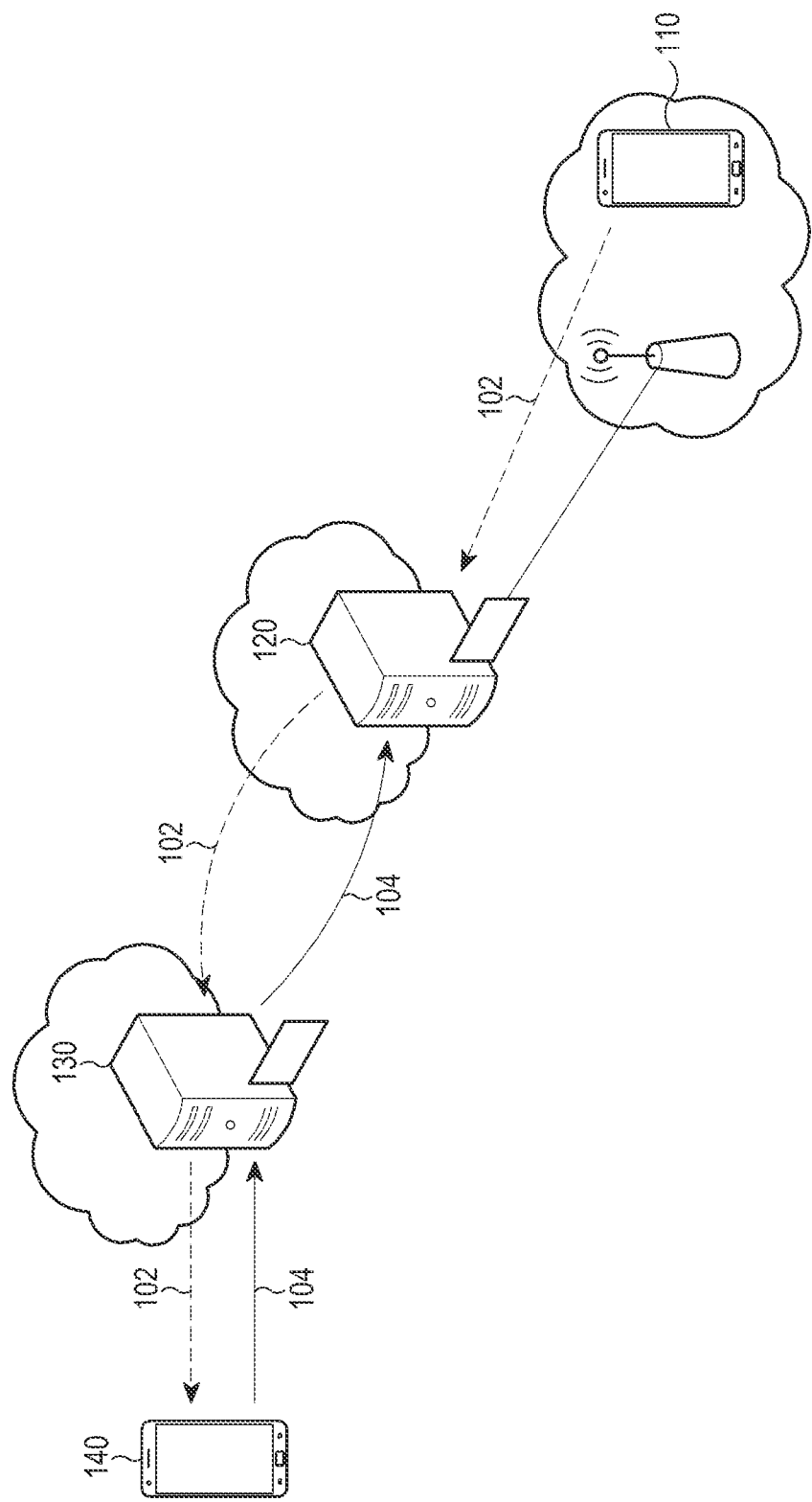
FIG. 1 illustrates a schematic of a Content Centric Network (CCN) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~and/or~," or the like.

The terminology used herein is for the purpose of describing particular various embodiments only and is not intended to be limiting of the disclosure.

It is to be understood that the singular forms "a," "an," and "the" include plural references unless the context clearly dictates otherwise. Thus, for example, reference to "a component surface" includes reference to one or more of such surfaces.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following various embodiments of the present disclosure, with a congestion impact parameter and interest canceling procedure in a Content Centric Network (CCN), performance of handling a Forwarding Information Base (FIB) and a Pending Interest Table (PIT) may be improved and data traffic generation, especially generation of duplicates of content on network links, may be reduced.

FIG. 1 illustrates a schematic of a CCN according to an embodiment of the present disclosure. The CCN illustrated herein will be described in conjunction with a mobile terminal in a mobile communication network.

Referring to FIG. 1, the CCN may include a first terminal 110 requesting content, a first node 120, a second terminal 140 that owns content, and a second node 130. The first terminal 110 may be managed by the first node 120, and the second terminal 140 may be managed by the second node 130.

The first terminal 110 may request particular content by sending the first node 120 an interest message 102, which may also be referred to as an interest packet, destined to a desired content name. Upon reception of the interest message 102, the first node 120 may search for a terminal that owns the content requested by the first terminal 110. The interest message 102 may be sent to a variety of network devices, e.g., various terminals, Access Points (APs), hubs, etc., connected over the CCN. The network devices may have a CCN engine which may be adaptively designed for divisional transmission for interest message/data.

The first node 120 may look up a PIT, which is a content routing table having content names as identifiers, to determine whether there is a routing list including a match of the content name included in the interest message 102, and may forward the interest message 102 to the second terminal 140 via the second node 130 based on interface information recorded in the routing list. The interest message 102 may pass through at least one intermediate node.

If the second terminal 140 that has received the interest message 102 owns particular content matched to the content name included in the interest message 102, then data 104 for the particular content wanted by the first terminal 110 may be sent to the first terminal 110 from the second terminal 140. The data 104 may be forwarded on a reverse path of the interest message 102 back to the first terminal 110. Sending the interest message 102 from the first terminal 110 to the second terminal 140 may be continued until completion of delivery of content requested by the first terminal 110.

Figure 2:
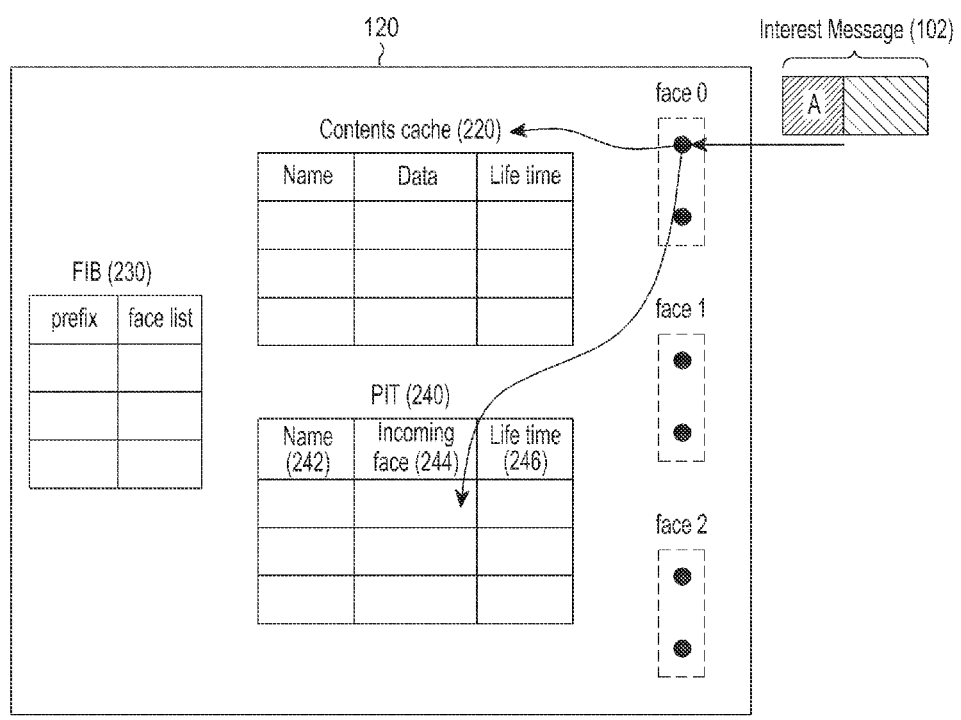
FIG. 2 illustrates a procedure of handling an interest message in a CCN node according to an embodiment of the present disclosure.

FIG. 2 illustrates a procedure of handling an interest message in a CCN node according to an embodiment of the present disclosure.

Referring to FIG. 2, a CCN node, which may be a first node 120, may include a content cache 220, which may also be referred to as a Content Store (CS), an FIB 230, and a PIT 240.

The content cache 220 may store at least one content name to identify cached content, data, a lifetime, and any other similar and/or suitable information related to the cached content. If receiving the interest message 102 with a content name "A" wanted by a sending or originating terminal, then the CCN node 120 may first look up the content cache 220 to determine whether the content cache 220 has content indicated by the interest message 102.

The FIB 230 may include a face list that indicates a destination or destinations to forward the interest message 102, the FIB 230 being looked up if the content indicated by the interest message 102 has not been found in the content cache 220. That is, if the CCN node 120 fails to find the content with the content name indicated by the interest message 102 from the content cache 220, then the CCN node 120 may look up the FIB 230 to determine where to forward the interest message 102. A face may be a connection to a network, an application, an application party, or any other similar and/or suitable network element and/or entity that may be connected to by the face.

For data or packet transfer, the PIT 240 may store interface information indicating an incoming face through which the interest message 102 has been received, i.e., an arrival face or a source face, and information indicating that the interest message 102 has been exchanged. In other words, the PIT 240 may include routing information for providing content to the user.

The PIT 240 may include a name field 242, an incoming face field 244 and a lifetime field 246. The name field 242 may include a name prefix of content-related data to indicate which content the interest message is about, i.e., indicate which data the interest message is about. From the information written in the name field 242, the CCN node 120 may determine what interest message was exchanged. The incoming face field 244 may record interface information indicating an interface through which the interest message was received. Specifically, the interface information may include information regarding a face or port through which the interest message was received, or a face from which at least a piece of content-related data is provided. The lifetime field 246, which is optional, may include information regarding how long the content-related data is to be maintained.

A procedure of handling an interest message, which is performed by the first node 120 for the first terminal 110, will now be described in connection with FIGS. 1 and 2.

If the first terminal 110 sends the interest message 102, then the first node 120 may first look up its content cache 220 to determine whether the first node 120 owns content A indicated by the interest message 102. If the first node 120 fails to find the content A in the content cache 220, then the first node 120 may look up the FIB 230 for the longest matching entry and may determine the next outgoing face based on the longest matching entry. The next outgoing entry indicates a next hop node to which the interest message 102 is forwarded.

The longest matching entry refers to an entry that best matches the content name indicated by the interest message, from among name prefixes stored in the FIB 230, i.e., in the content name based address system. For example, if it is assumed that a destination address is '75.2.67.4' and the FIB 230 has IP routing addresses '75.x.x.4', '75.2.x.7' and '75.2.67.11', then the IP routing address '75.2.67.11' best matches the destination address '75.2.67.4' because they have three numbers in common. Thus, the longest matching entry becomes '75.2.67.11', meaning that it is most likely to find the requested content near the address '75.2.67.11'.

The first node 120 may store information in the PIT 240 indicating that the interest message 102 was forwarded to the next hop for subsequent data forwarding. The first node 120 may determine a delivery path of the received data in the PIT 240.

Figure 3:
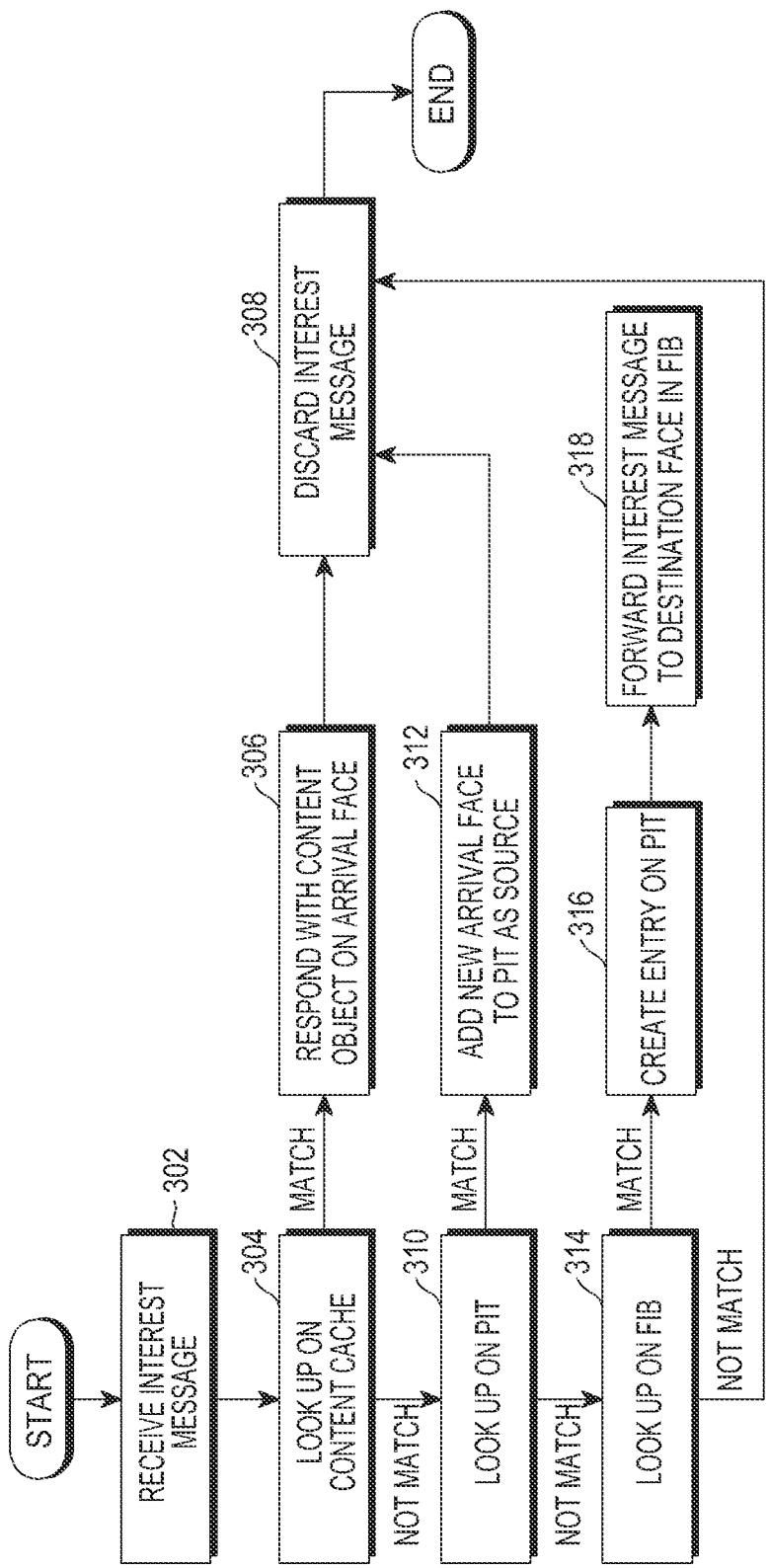
FIG. 3 is a flowchart illustrating a procedure of handling an interest message according to an embodiment of the present disclosure.

FIG. 3 is flowchart illustrating a procedure of handling an interest message according to an embodiment of the present disclosure.

Referring to FIG. 3, upon reception of an interest message, via broadcasting or multicasting, in operation 302, a CCN node may look up the CCN node's content cache with a content name contained in the interest message to determine whether content indicated by the interest message is cached at the CCN node, in operation 304. If content with the matched content name is found in the content cache, then, in operation 306, the CCN node may deliver a content object that corresponds to the content via an arrival face, which is an arrival interface for the interest message, on a reverse path of the interest message. Then, in operation 308, the CCN node may discard the interest message.

Otherwise, in operation 304, if there is no matched content name in the content cache, then, in operation 310, the CCN node may look up on its PIT with the content name. If there is a matched content name in the PIT, then, in operation 312, the CCN node may add an arrival face, indicating an interface through which the interest message was received, to the PIT as a new source face for the incoming face corresponding to the content name, and then the CCN node may proceed to operation 308 to discard the interest message and end the process.

Otherwise, in operation 310, if there is no matched content name in the PIT, then, in operation 314, the CCN node may look up on the FIB. If the FIB has a matched content name, then, in operation 316, the CCN node may create an entry for the content name in the PIT, and in operation 318, the CCN node may forward the interest message to a destination face in the FIB, or to any interfaces of the face list stored in the FIB. Otherwise, if there is no matched content name, even in the FIB, then the CCN node may go to operation 308 to discard the interest message.

Figure 4:
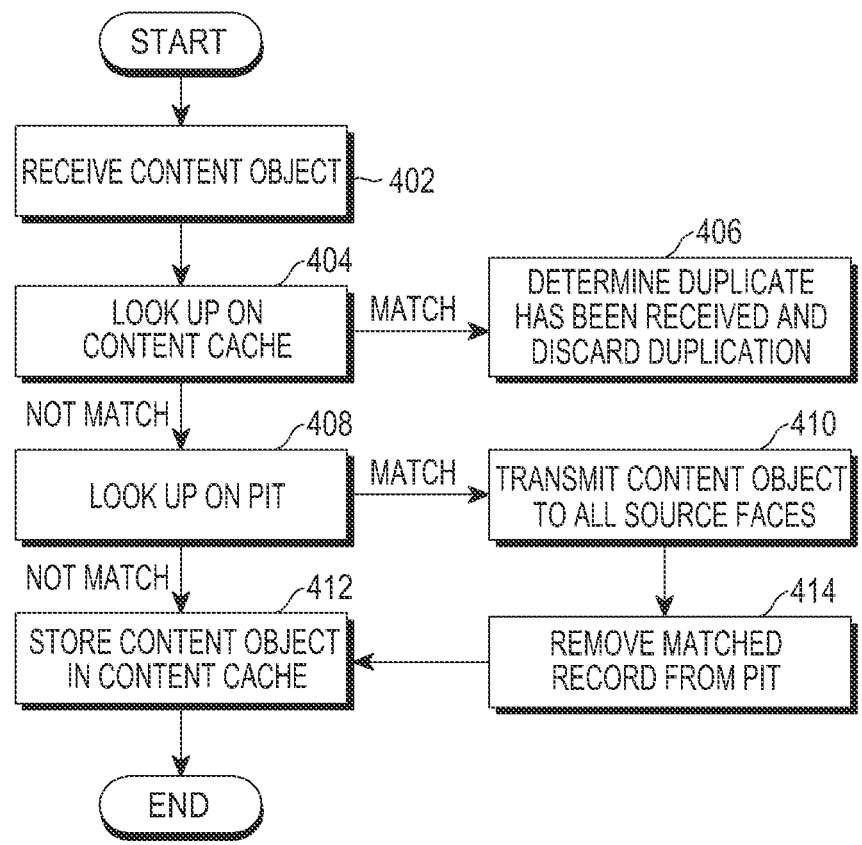
FIG. 4 is flowchart illustrating a procedure of handling a content object according to an embodiment of the present disclosure.

FIG. 4 is flowchart illustrating a procedure of handling a content object according to an embodiment of the present disclosure.

Referring to FIG. 4, upon reception of a content object, in operation 402, the CCN node may look up its content cache with a content name of the content object, in operation 404. If there is a matched content name, then, in operation 406, the CCN node may determine that a duplicate content object has been received and may discard the content object. If there is no matched content name, then, in operation 408, the CCN node may look up on the PIT to determine whether there is a pending interest message with respect to the content name. If the content object is not cached in the content cache nor found in the PIT, then, in operation 412, the CCN node may store the content object in the content cache. Otherwise, if there is a pending interest message with respect to the content name, then, in operation 410, the CCN node may transmit the content object to all source faces by sending the content object through a matched incoming face in the PIT and, in operation 414, the CCN node may remove the matched record from the PIT to prevent duplicated transmission, and may go back to operation 412.

As described above, the CCN node may forward the interest messages based on records of the FIB. When a not-cached interest message is received, the not-cached interest message may be forwarded to all FIB destinations in the face list that have matched CCN name prefixes. However, even if the interest message corresponds to multiple content hosts, merely the first received content may be eventually delivered to the incoming interface and the remaining content may be dropped because they are duplicates of the first content. Thus, if a single name prefix corresponds to one or more interfaces, most traffic may be discarded on a subsequent link of the CCN node.

Figures 5, 6:
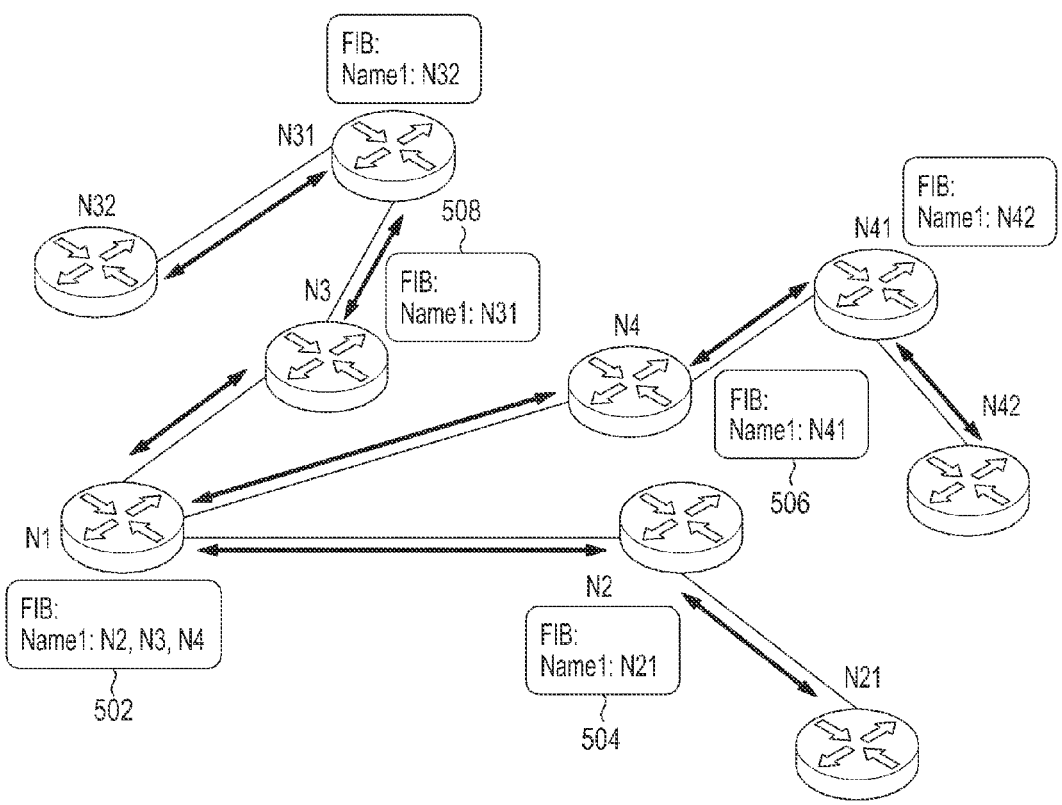
FIG. 5 illustrates a CCN traffic delivery process according to an embodiment of the present disclosure.
FIG. 6 illustrates a Forwarding Information Base (FIB) according to an embodiment of the present disclosure.

FIG. 5 illustrates a CCN traffic delivery process according to an embodiment of the present disclosure.

Referring to FIG. 5, an FIB of a CCN node N1 502, which is hereinafter referred to as (hereinafter, referred to as FIB_N1 502, stores a face list for a name prefix "Name 1", including N2, N3, and N4. If an interest message with "Name 1" is received at the CCN node N1, then the CCN node N1 may forward the interest message to subsequent CCN nodes N2, N3, and N4 based on the FIB_N1 502. The CCN nodes N2, N3, and N4 may then forward the received interest message to CCN nodes N21, N31, N32, N41, and N42, respectively, based on their respective FIBs 504, 506 and 508. All contents responding to the interest message are delivered on reverse paths of the interest message back to the CCN node N1.

In the above procedure, all the contents may be stored in every node that the contents passes through while being delivered from the CCN nodes N21, N32 and N42 back to the CCN node N1, even though only the node N1 wants the content. In this case, if the content sizes are large, too much link traffic and many caches on the links may be wasted. Furthermore, if link speeds of the CCN nodes N1 through N21, the CCN nodes N1 through N32, and the CCN nodes N1 through N42 are significantly different, e.g., if a link speed of the CCN nodes N1 through N21 is faster than the others, content from the CCN node N21 may be received at the CCN node N1 while contents from the CCN node N32 and the CCN node N42 are being on their paths. That is, despite the CCN node N1 not wanting more content, contents are still being sent to the CCN node N1 from the CCN node N32 and the CCN node N42. This may cause a waste of link traffic and have a big impact on the transfer speed of other content.

In the following various embodiments of the present disclosure, by canceling transfer of unnecessary content and preventing an interest message from being sent on congestion links, data traffic on network links may be reduced and network link usage rates may be increased.

FIG. 6 illustrates an FIB according to an embodiment of the present disclosure.

Referring to FIG. 6, an FIB may include a name prefix field 602, a destination face field 604, and congestion impact field 606 representing a relative time taken to receive additional content. Specifically, the congestion impact field 606 may record differences between respective reception times of contents with the same content name from different faces and first reception times of content with the same content name. For example, the congestion impact field may record '0' for content received first.

Specifically, if an interest message indicating a content name "abc" is forwarded to three destination faces, F1="10.32.41.21:7621", F2="165.23.4.33:8812", F3="117.23.5.12:5481" and content requested by the interest message is received from the destination face F3 first, then the congestion impact field may record '0' for the destination face F3. If contents are received from the destination faces F1 and F2, at respective times T1, wherein the time T1=1235, and T2, wherein the time T2=6912, after the content is received from the destination face F3, respectively, then the congestion impact field may record the times T1 and T2 for the destination faces F1 and F2, respectively. A representation form of the CCN nodes is not limited to what is shown in FIG. 6, but may conform to any CCN rules, and a time unit of the congestion impact field may also be determined according to the CCN rules.

Figures 7, 8:
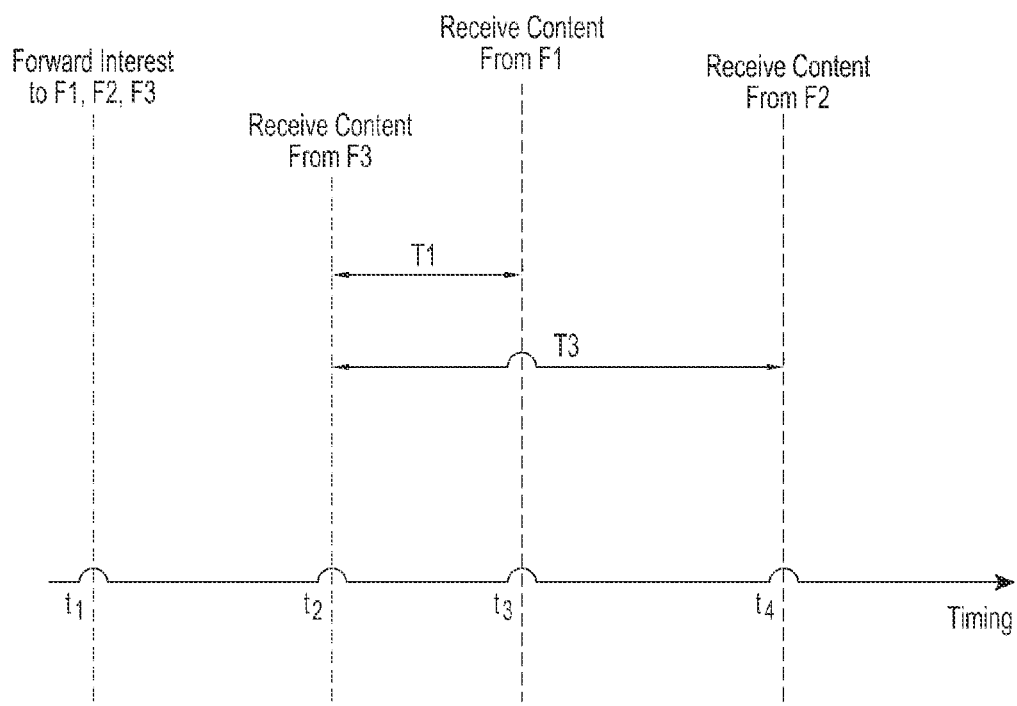
FIG. 7 illustrates content reception timing according to an embodiment of the present disclosure.
FIG. 8 illustrates a pending interest table according to an embodiment of the present disclosure.

FIG. 7 illustrates content reception timing according to an embodiment of the present disclosure.

Referring to FIG. 7, an interest message is forwarded from a CCN node to faces F1, F2, and F3 at a time point t1, and content requested by the interest message is first received from the face F3 at time point t2. Thus, the congestion impact field may record '0' for the face F3 for a content name of the interest message in a FIB of the CCN node. Then, if content is received from the face F1 at time point t3, then the CCN node may record time T1, wherein the time T1=t3−t2, in the congestion impact filed for the face F1 for the content name of the interest message in the FIB. Likewise, if content is received from the face F2 at time point t4, then the CCN node may record time T2, wherein the time T2=t4−t2 in the congestion impact filed for the face F2 for the content name of the interest message in the FIB.

FIG. 8 illustrates a PIT according to an embodiment of the present disclosure.

Referring to FIG. 8, a PIT may include a name field 802, an incoming face field 804, and an optional transmit time field 806. The name field 802 and incoming face field 804 are the same as those described previously, and the transmit time field 806, which is optional, may record a time at which each interest message is sent.

In the following various embodiments of the present disclosure, a cancel interest message for canceling content delivery, a time test interest message for testing transfer time, and a time test reply content object for replying to the time test interest message will be described.

The cancel interest message may be configured to have a 'cancel' flag component in addition to a normal interest message that requests content. The cancel interest message may have the same name prefix as an origin interest message. The cancel interest message is used to cancel an interest message transmitted previously, which has an origin content name.

The time test interest message may be configured to have a 'time test' flag component in addition to the normal interest message. The time test interest message may have the same name prefix as the origin interest message. The time test reply content object may be sent as a reply to the time test interest message, and may have the same name prefix as a normal content object sent as a reply to the normal interest message but may not have any actual content. The time test interest message and time test reply content object may be used to test how long it takes to fetch content with the origin CCN name.

Once the CCN node has received the content object and an associated interest message has been forwarded to one or more faces, then the CCN node may notify that the requested content has been received and that no more content is wanted by sending the cancel interest message to the other faces.

If the CCN node received the normal interest message and there is at least one face matched to a name prefix of the normal interest message in the FIB of the CCN node, then the CCN node may forward the normal interest message to those faces whose congestion impact is not greater than a threshold, and may send the time test interest message to the other faces whose congestion impact is greater than the threshold.

If the CCN node has received the cancel interest message and there is any content matched to a content name of the cancel interest message, then the CCN node may not send a content object, but rather, the CCN node may only send the time test reply content object with the content name of the cancel interest message and may remove records associated to the content name from the PIT.

If the CCN node received the time test interest message and there is content matched to the content name of the time test interest message, then the CCN node may send the time test reply content object with the same content name as the time test interest message.

Figure 9:
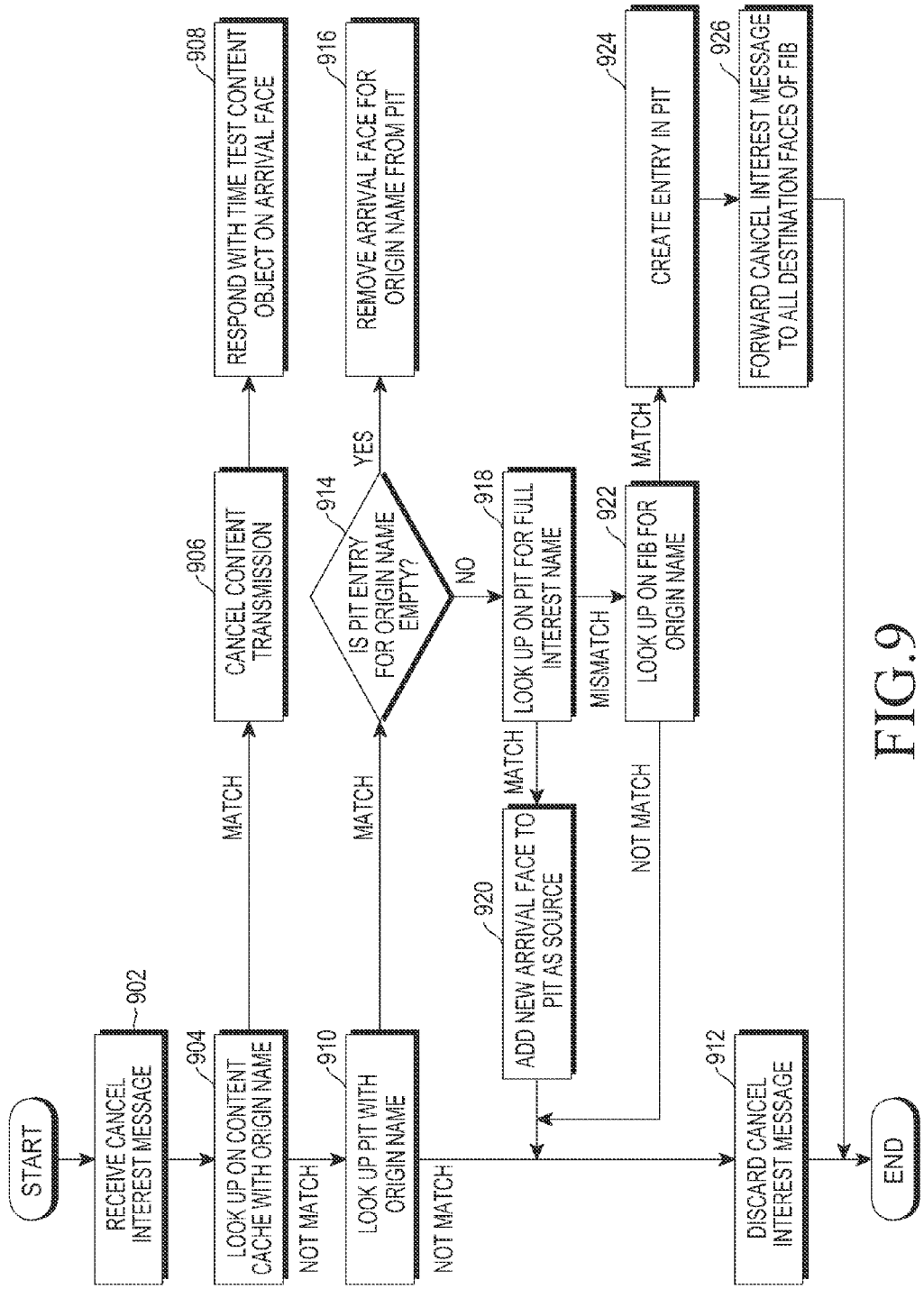
FIG. 9 is flowchart illustrating a procedure of receiving a cancel interest message according to an embodiment of the present disclosure.

FIG. 9 is flowchart illustrating a procedure of receiving a cancel interest message according to an embodiment of the present disclosure.

Referring to FIG. 9, in operation 902, a CCN node may receive a cancel interest message that contains a cancel component through broadcasting or multicasting, and in operation 904, the CCN node may look up the content cache with an origin name contained in the cancel interest message. The origin name in the cancel interest message indicates the content name of the interest message whose transmission is to be canceled, representing that the cancel interest message excludes the cancellation component. If the origin name has a match in the content cache, then, in operation 906, the CCN node may determine that an origin node has already fetched content indicated by the cancel interest message, and in operation 908, the CCN node may send the time test content object to an arrival face for the cancel interest message. Time test content object may be sent to notify the origin node of an expected reception time of the content.

Otherwise, if the origin name has no match in the content cache in operation 904, then, in operation 910, the CCN node may look up the PIT with the origin name. If the origin name has no match in the PIT, then, in operation 912, the CCN node may determine that the content would not be delivered and the CCN node may discard the cancel interest message.

Otherwise, if the origin name has a match in the PIT, then, in operation 916, the CCN node may prevent the content from being forwarded by removing an arrival face for the origin name from the PIT.

Before performing operation 916, in operation 914, the CCN node determines whether a PIT entry for the origin name is empty. If it is determined that the PIT entry is empty, then such means that a source face waiting for the same content does not exist, and thus in operation 918, the CCN node may looks up the PIT with a full interest name. The full interest name indicates a content name resulting from addition of the origin name to the cancel component. If the full interest name exists in the PIT, then, in operation 920, the CCN node may determine that some other requesting nodes are also sending the cancel interest message, may add a new arrival face to the source field of the PIT, and may proceed to operation 912 to discard the cancel interest message.

Otherwise, if the full interest name does not exist in the PIT, then, in operation 922, the CCN node may look up the FIB with the origin name. If there is no match of the origin name in the FIB, then the CCN node may determine that no content would be forwarded to the CCN node and may proceed to operation 912 to discard the cancel interest message. Otherwise, if there is a match of the origin name in the FIB, then, in operation 924, the CCN node may create an entry for the origin name in the PIT, and in operation 926, the CCN node may forward the cancel interest message to all the destination faces in the FIB.

Figure 10:
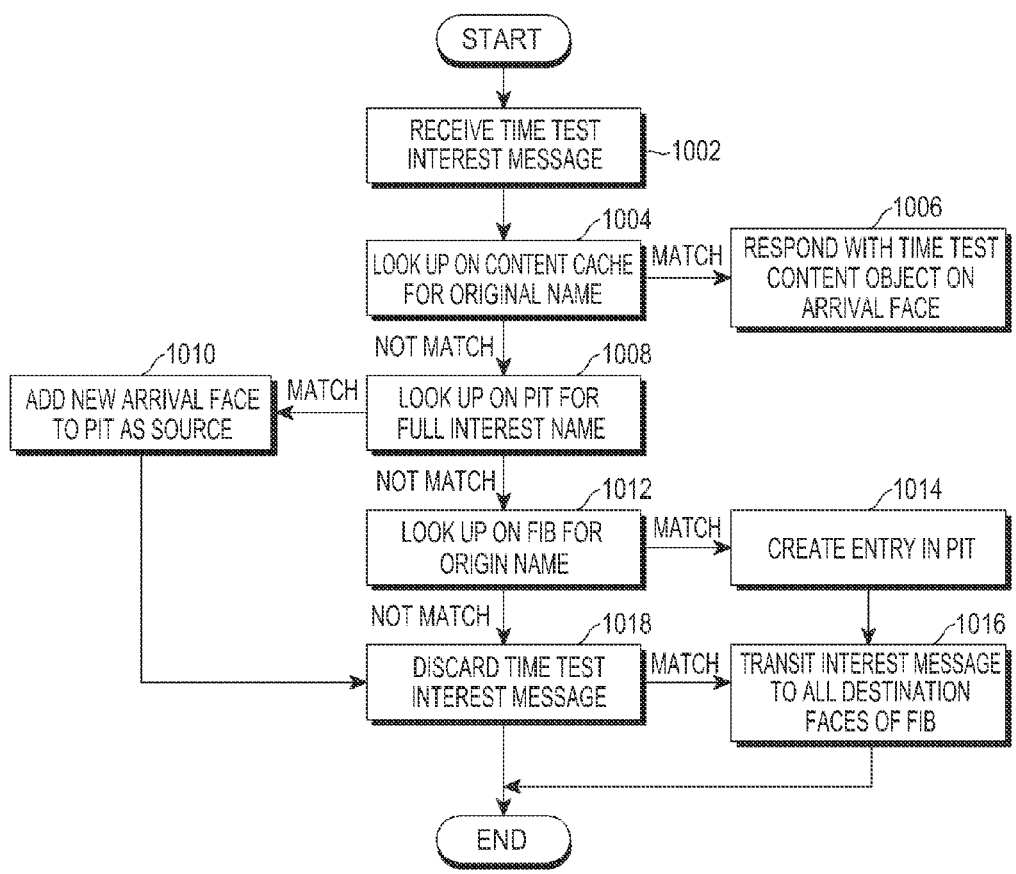
FIG. 10 is flowchart illustrating a procedure of receiving a test interest message according to an embodiment of the present disclosure.

FIG. 10 is flowchart illustrating a procedure of receiving a test interest message according to an embodiment of the present disclosure.

Referring to FIG. 10, in operation 1002, a CCN node may receive a time test interest message that contains a "time test" component via broadcasting or multicasting, and then, in operation 1004, may look up its content cache with an origin name contained in the time test interest message. If there is a match of the origin name in the content cache, then, in operation 1006, the CCN node may determine that an origin node is able to fetch the content in question from the CCN node and may respond with the time test content object on the arrival face.

Otherwise, if the origin name has no match in the content cache in operation 1004, then, in operation 1008, the CCN node may look up the PIT with a full interest name. If the full interest name exists in the PIT, then, in operation 1010, the CCN node may determine that some other requesting nodes are also sending the time test interest message, may add a new arrival face to the source field of the PIT, and may proceed to operation 1018 to discard the time test interest message.

Otherwise, if the full interest name does not exist in the PIT, then, in operation 1012, the CCN node may look up the FIB with the origin name. If there is no match of the origin name in the FIB, then the CCN node may determine that no content would be forwarded to the CCN node and may proceed to operation 1018 to discard the time test interest message.

Otherwise, if there is a match of the origin name in the FIB, then, in operation 1014, the CCN node may create an entry for the origin name in the PIT, and then, in operation 1016, the CCN node may forward the time test interest message to all the destination faces in the FIB to request them to test the transfer time.

Figure 11:
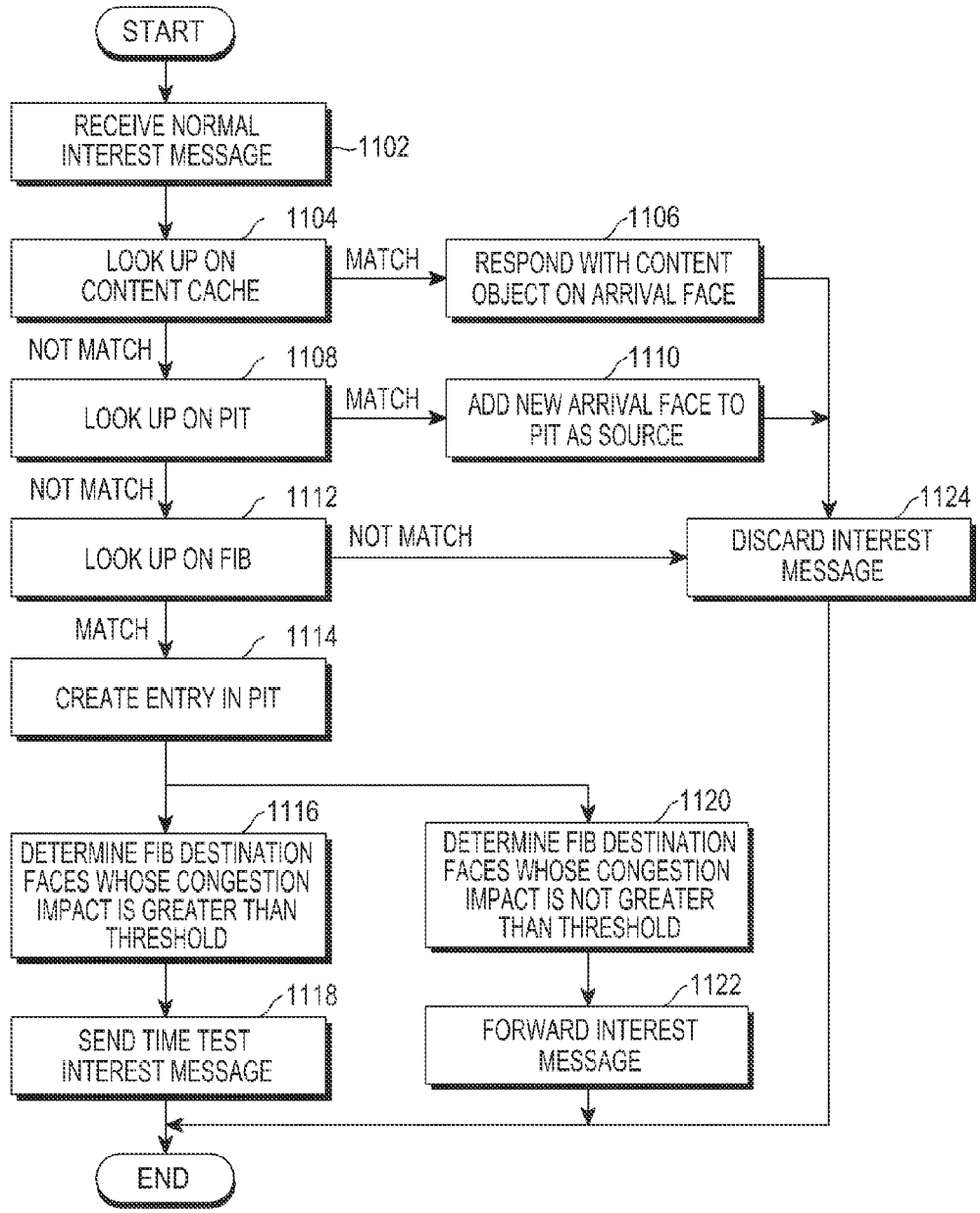
FIG. 11 is flowchart illustrating a procedure of handling a normal interest message according to an embodiment of the present disclosure.

FIG. 11 is flowchart illustrating a procedure of handling a normal interest message according to an embodiment of the present disclosure.

Referring to FIG. 11, upon reception of an interest message, which may also be referred to as a normal interest message, via broadcasting or multicasting in operation 1102, the CCN node may look up its content cache with a content name included in the interest message to determine whether content requested by the interest message is cached, in operation 1104. If content with the matched content name is found in the content cache, then the CCN node may deliver a content object that corresponds to the content via an arrival face of the interest message, on a reverse path of the interest message, in operation 1106. Then, the CCN node may discard the interest message in operation 1124.

Otherwise, if there is no matched content name in the content cache, the CCN node may look up the PIT with the content name, in operation 1108. If there is a match of the content name in the PIT, then the CCN node may add an incoming face that indicates an interface through which the interest message has been received, to the PIT as a new source face for the incoming face for the content name, in operation 1110, and then, in operation 1124, discard the interest message and end the process.

Otherwise, if there is no match of the content name in the PIT, then, in operation 1112, the CCN node may look up the FIB. If there is a match of the content name in the FIB, then, in operation 1114, the CCN node may create an entry for the content name in the PIT. Otherwise, if there is no matched content name even in the FIB, then, in operation 1124, the CCN node may discard the interest message.

In operation 1116, the CCN node may determine FIB destination faces whose congestion impact is greater than a threshold, which may be predetermined, by inspecting congestion impacts for all destination faces in the FIB, and then, in operation 1118, the CCN node may send the time test interest message for the determined destination faces to update their congestion impacts.

In operation 1120, the CCN node may determine FIB destination faces whose congestion impact is not greater than the threshold by inspecting congestion impacts for all the destination faces in the FIB, and then, in operation 1122, the CCN node may forward the interest message to the determined destination faces.

Figure 12:
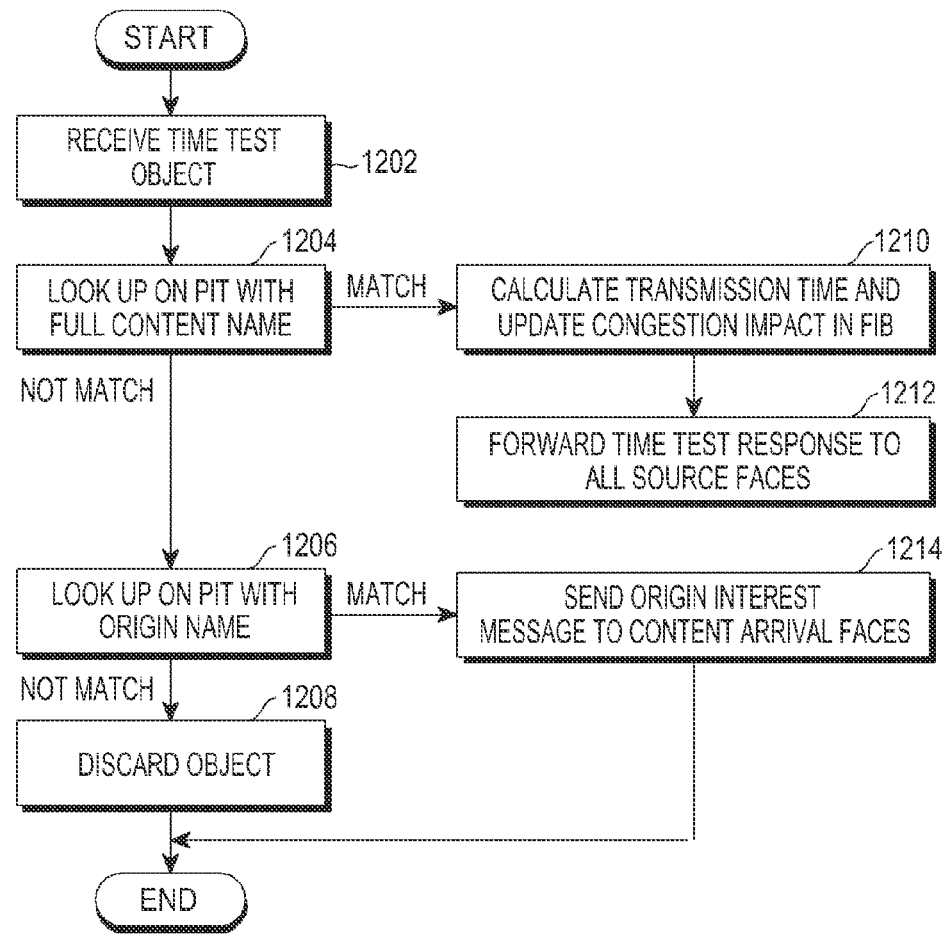
FIG. 12 is flowchart illustrating a procedure of receiving a time test reply content object according to an embodiment of the present disclosure.

FIG. 12 is flowchart illustrating a procedure of receiving a time test reply content object according to an embodiment of the present disclosure.

Referring to FIG. 12, in operation 1202, the CCN node may receive a content object, which may be referred to as a time test object, and determine if the content object is a time test reply content object, which is received as a reply to the time test interest message. In operation 1204, the CCN node may look up the PIT with a full content name of the time test reply content object. If there is a record matched to the full content name of the time test reply content object in the PIT, then, in operation 1210, the CCN node may calculate a transmission time taken for the CCN node to receive the time test reply content object since a transmission of the time test interest message, and based on the calculated time, the CCN node may update the congestion impact field of the FIB that corresponds to a receiving face of the time test reply content object. In operation 1212, the CCN node may forward the time test reply content object to all the source faces of the PIT.

Otherwise, if there is no record matched to the full name of the time test reply content object, then, in operation 1206, the CCN node may determine that the time test interest message was sent from the CCN node itself and look up the PIT with an origin name of the time test reply content object. The origin name is obtained by removing a time test component of the time test interest message from the full name of the time test reply content object.

If the origin name exists in the PIT, then, in operation 1214, the CCN node may determine that the CCN node itself requested content with the origin name but the content has not yet arrived, and may send an origin interest message to content arrival faces listed in the PIT. Otherwise, if the origin name does not exist in the PIT, then, in operation 1208, the CCN node may discard the time test reply content object.

Figure 13:
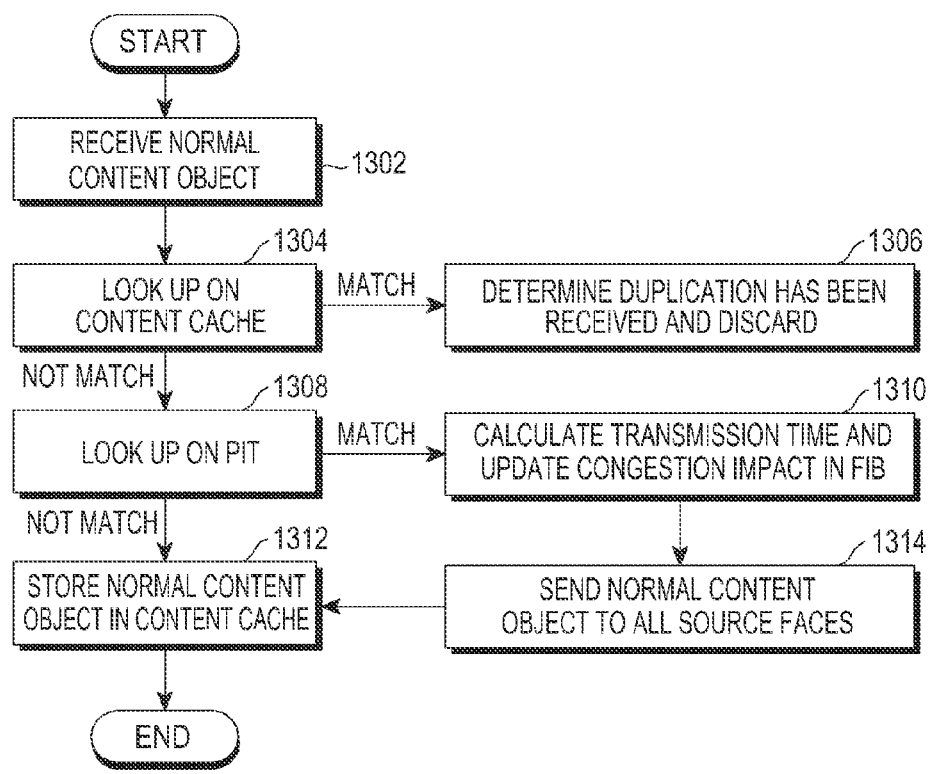
FIG. 13 is flowchart illustrating a procedure of receiving a normal content object according to an embodiment of the present disclosure.

FIG. 13 is flowchart illustrating a procedure of receiving a normal content object according to an embodiment of the present disclosure.

Referring to FIG. 13, in operation 1302, the CCN node may receive a content object and determine if the content object is a normal content object which is received as a reply to a normal interest message. In operation 1304, the CCN node may look up its content cache with a content name of the normal content object. If there is a matched content name, then, in operation 1306, the CCN node may determine that a duplicate content object has been received and may discard the content object. If there is no matched content name, then, in operation 1308, the CCN node may look up its PIT to detect whether there is a pending interest message with respect to the content name. If the content object is not cached in the content cache nor found in the PIT, then, in operation 1312, the CCN node may store the content object in the content cache.

Otherwise, if there is a pending interest message with respect to the content name, then, in operation 1310, the CCN node may calculate a transmission time taken for the CCN node to receive the content object since transmission of the normal interest message, and based on the calculated time, may update a congestion impact field of the FIB that corresponds to the content name of the content object via an incoming face from which the content object has been received. The transmission time may refer to a transfer time taken for the CCN node to receive the content object since the CCN node sent the interest message.

After updating the congestion impact field, then, in operation 1314, the CCN node may send the content object through the incoming face in the PIT and remove the corresponding record from the PIT to prevent duplicate transmission of the content object, and may go back to operation 1312.

Figure 14:
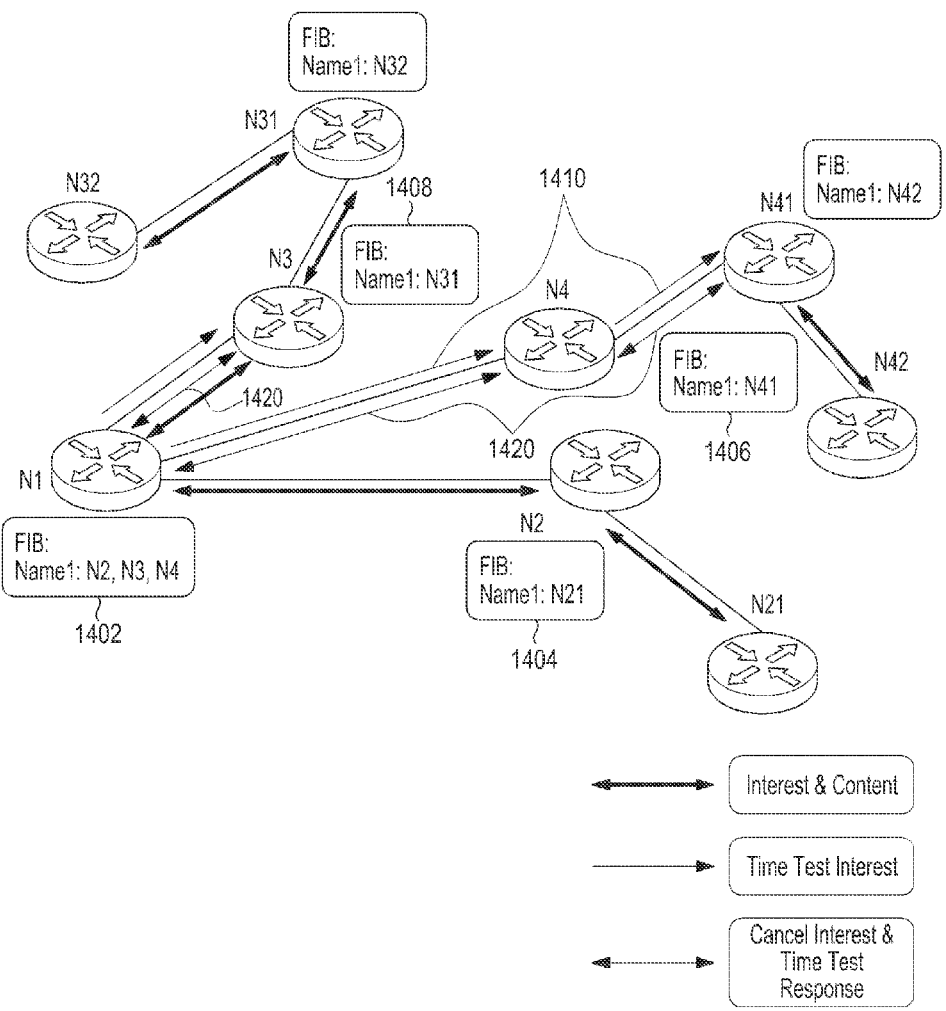
FIG. 14 illustrates delivery of a cancel interest message according to an embodiment of the present disclosure.

FIG. 14 illustrates delivery of a cancel interest message according to an embodiment of the present disclosure.

Referring to FIG. 14, an FIB of a CCN node N1 1402, which may also be referred to as FIB_N1 142, stores a face list for a name prefix "Name 1", including N2, N3, and N4. If an interest message with "Name 1" is received at the CCN node N1, then the CCN node N1 may forward the interest message to subsequent CCN nodes N2, N3, and N4 based on the FIB_N1 1402. The CCN nodes N2, N3, and N4 may then forward the received interest message to CCN nodes N21, N31, N32, N41, and N42, respectively, based on their respective FIBs 1404, 1406 and 1408. All contents responding to the interest message are delivered on reverse paths of the interest message back to the CCN node N1.

If content originated from the CCN node N21 arrives first at the CCN node N1, then the CCN node N1 may send a cancel interest message 1420 to the CCN nodes N3 and N4, so that data traffic generation for the content on links between the CCN nodes N1 and N3, N1 and N4, and N4 and N41 may be prevented.

A congestion impact of the FIB_N1 1402 may be updated using a time test interest message 1410 and time test reply content object.

Figure 15:
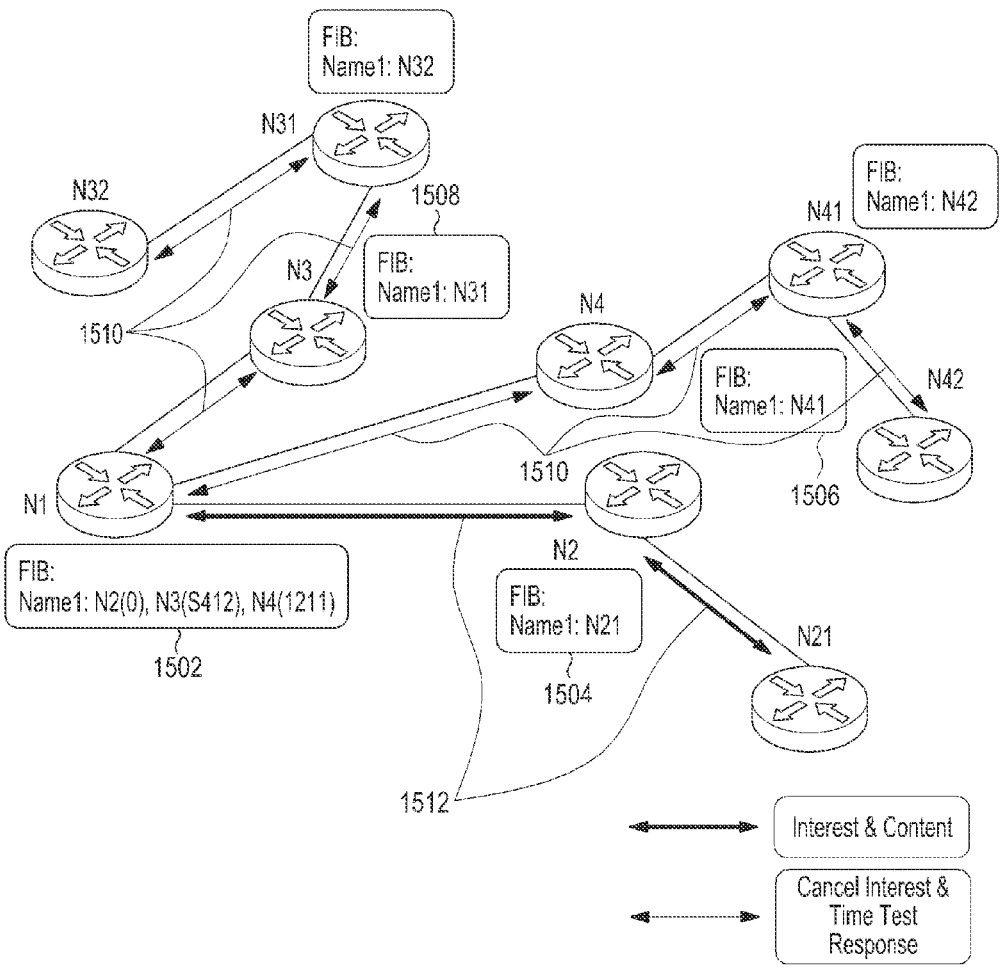
FIG. 15 illustrates delivery of a time test interest message and time test reply according to an embodiment of the present disclosure.

FIG. 15 illustrates delivery of a time test interest message and time test reply according to an embodiment of the present disclosure.

The FIB, FIB_N1 1502, of a CCN node N1, is as follows: FIB_N1: Name1-N2(0), N3(5412), N4(1211), which means that for a name prefix "Name1" of the CCN node N1, a congestion impact of a CCN node N2 is 0 and a congestion impact of a CCN node N4 is 1211. Additionally, CCN nodes N21, N3, N31, N32, N41, and N42, and FIBs FIB_N2 1504, FIB_N4 1506, and FIB_N3 1508 are also illustrated in FIG. 15.

In this example, a congestion impact threshold is 1000, and all intermediate nodes do not have their respective content caches.

Once an interest message with "Name1" is received at the CCN node N1, the CCN node N1 may forward the interest message to the CCN node N2 while sending a time test interest message 1510 to the CCN nodes N3 and N4 based on a previous transmission record. This is because the CCN node N1 may already know that data traffic from the CCN nodes N3 and N4 would be slower than from the CCN node N2. Accordingly, unnecessary traffic may not be generated on the CCN nodes N3 and N4 related links. If time taken for reply since the time test is less than the threshold, a next interest message may be forwarded.

Figure 16:
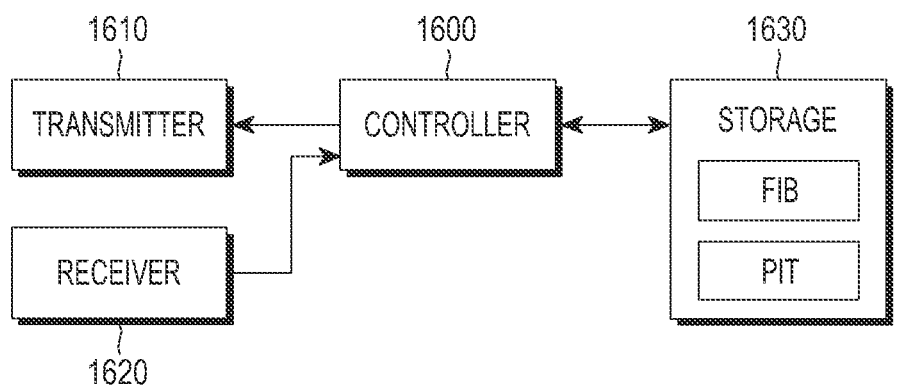
FIG. 16 is a block diagram of a CCN node according to an embodiment of the present disclosure.

FIG. 16 is a block diagram of a CCN node according to an embodiment of the present disclosure.

Referring to FIG. 16, a CCN node may include a controller 1600, a transmitter 1610, a receiver 1620, and a storage 1630. The receiver 1620 may be a hardware element that may receive Radio Frequency (RF) signals and may receive an interest message or content object from any other terminal or node and may pass the interest message or content object to the controller 1600. The controller 1600 may be a hardware element such as a processor, a microcontroller, an Integrated Circuit (IC), or any other similar and/or suitable hardware element and may look up or update an FIB and PIT stored in the storage 1630 based on the interest message or content object, and may determine destinations to forward the interest message or content object, if necessary. The transmitter 1610 may be a hardware element that may transmit RF signals and may send the interest message or content object to the determined destinations under control of the controller 1600. The storage 1630 may be a non-volatile computer readable storage medium, such as an IC, a Read Only Memory (ROM), a Random Access Memory (RAM), a magnetic storage device, and optical storage device, or any other similar and/or suitable hardware element that may be used as a non-volatile computer readable storage medium.

While the present disclosure has been shown and described with reference to various embodiments thereof, it will be understood by those skilled in the art that various changes in form and details may be made therein without departing the spirit and scope of the present disclosure as defined by the appended claims and their equivalents.

What is claimed is:

1. A content centric network (CCN) communication method comprising:
    managing a forwarding information base (FIB) indicating destinations to forward an interest message that requests content, which is performed by a CCN node, wherein the FIB includes at least one of a name prefix field indicating a content name, a face list field indicating destinations to forward an interest message that requests content with the content name, and a congestion impact field indicating a relative time taken to receive the content from a corresponding destination in response to the interest message;
    receiving a first interest message;
    forwarding the first interest message to at least one destination node based on the congestion impact field; and
    transmitting, to other destination nodes other than a first destination node from among the at least one destination node, a cancel interest message to request the other destination nodes to cancel delivery of the content, if a content object requested by the first interest message is received from the first destination node of the at least one destination node,
    wherein the at least one destination node is selected that a congestion impact field of each of the at least one destination node has a value less than or equal to a predetermined threshold, from among destination faces matched to a content name included in the first interest message based on the FIB.

2. The CCN communication method of claim 1, wherein the congestion impact field records time differences between respective reception times of contents with the same content name from different destinations and first reception times of a content with the same content name.

3. The CCN communication method of claim 1, further comprising:
    forwarding a time test interest message to at least one destination node, whose congestion impact field has a value greater than the predetermined threshold, from among destination faces matched to the content name of the first interest message;
    receiving a time test reply content object that responds to the time test interest message;
    calculating a time taken to receive the time test reply content object since transmission of the time test interest; and
    updating a congestion impact field of the FIB for the content name included in the first interest message based on the calculated time.

4. The CCN communication method of claim 1, further comprising:
    receiving the content object requested by the first interest message from the first destination node of the at least one destination node, after the first interest message is forwarded;
    calculating a time taken to receive the content object since the first interest message has been forwarded; and
    updating a congestion impact field of the FIB for a content name included in the first interest message based on the calculated time.

5. The CCN communication method of claim 1, further comprising:
    managing a pending interest table (PIT) that includes records of interest messages having been received, which is performed by the CCN node, wherein the PIT includes at least one of a name field indicating a content name, an arrival face field indicating an arrival face at which an interest message requesting content with the content name has been received, and a transmit time field indicating a time when the interest message was sent to a destination node; and
    updating the transmit time field to indicate a time when the first interest message is forwarded after the first interest message had been forwarded.

6. The CCN communication method of claim 1, further comprising:
    receiving the cancel interest message and looking up a content cache for an origin content name of the cancel interest message;
    canceling delivery of content with the origin content name if there is a match of the origin content name in the content cache;
    looking up a pending interest table (PIT) with the origin content name if there is no match of the origin content name in the content cache; and
    removing an arrival face for the origin content name from the PIT if there is a match of the origin content name in the PIT.

7. The CCN communication method of claim 6, wherein the content cache includes at least one of a content name to identify cached content, data of the content, and a lifetime of the content.

8. The CCN communication method of claim 6, further comprising:
    looking up the PIT with a full interest name obtained by adding a cancel component of the cancel interest message to the origin content name if an entry for the origin content name is empty in the PIT;

adding, if the full interest name exists in the PIT, a new arrival face to the PIT and discarding the cancel interest message;

looking up the FIB, if the full interest name does not exist in the PIT, with the origin content name; and adding, if the origin content name has a match in the FIB, a new entry to the PIT and forwarding the cancel interest message to at least one destination node determined by the FIB.

9. A communication apparatus in a content centric network (CCN), the communication apparatus comprising:
a processor configured to manage a forwarding information base (FIB) indicating destinations to forward an interest message that requests content, wherein the FIB includes at least one of a name prefix field indicating a content name, a face list field indicating destinations to forward an interest message that requests content with the content name, and a congestion impact field indicating a relative time taken to receive the content from a corresponding destination in response to the interest message; and
a transceiver configured to:
receive a first interest message,
forward the first interest message to at least one destination node based on the congestion impact field, and
transmit, to other destination nodes other than a first destination node from among the at least one destination node, a cancel interest message to request the other destination nodes to cancel delivery of the content, if a content object requested by the first interest message is received from the first destination node of the at least one destination node,
wherein the transceiver is configured to select the at least one destination node, that a congestion impact field of each of the at least one destination node has a value less than or equal to a predetermined threshold, from among destination faces matched to a content name included in the first interest message based on the FIB.

10. The CCN communication apparatus of claim 9, wherein the congestion impact field records time differences between respective reception times of contents with the same content name from different destinations and first reception times of a content with the same content name.

11. The CCN communication apparatus of claim 9, wherein the transceiver is configured to:
forward a time test interest message to at least one destination node, whose congestion impact field has a value greater than the predetermined threshold, from among destination faces matched to the content name of the first interest message,
receive a time test reply content object that responds to the time test interest message,
calculate a time taken to receive the time test reply content object since transmission of the time test interest, and
update a congestion impact field of the FIB for the content name included in the first interest message based on the calculated time.

12. The CCN communication apparatus of claim 9, wherein the transceiver is configured to:
receive the content object requested by the first interest message from the first destination node of the at least one destination node, after the first interest message is forwarded, and
calculate a time taken to receive the content object since the first interest message has been forwarded, and
update a congestion impact field of the FIB for the content name included in the first interest message based on the calculated time.

13. The CCN communication apparatus of claim 9, wherein the processor is configured to:
manage a pending interest table (PIT) that includes records of interest messages having been received,
wherein the PIT includes at least one of a name field indicating a content name, an arrival face field indicating an arrival face at which an interest message requesting content with the content name has been received, and a transmit time field indicating time when the interest message was sent to a destination node, and
update the transmit time field with a time to indicate when the first interest message is forwarded after the first interest message had been forwarded.

14. The CCN communication apparatus of claim 9, wherein the processor is configured to:
look up a content cache for an origin content name of the cancel interest message, upon reception of the cancel interest message,
cancel delivery of content with the origin content name if there is a match of the origin content name in the content cache,
look up a pending interest table (PIT) with the origin content name if there is no match of the origin content name in the content cache, and
remove an arrival face for the origin content name from the PIT if there is a match of the origin content name in the PIT.

15. The CCN communication apparatus of claim 14, wherein the content cache includes at least one of a content name to identify cached content, data of the content, and a lifetime of the content.

16. The CCN communication apparatus of claim 14, wherein the processor is configured to:
look up the PIT with a full interest name obtained by adding a cancel component of the cancel interest message to the origin content name if an entry for the origin content name is empty in the PIT,
add a new arrival face to the PIT and discarding the cancel interest message if the full interest name exists in the PIT,
look up the FIB with the origin content name if the full interest name does not exist in the PIT, and
add a new entry to the PIT and forward the cancel interest message to at least one destination node determined by the FIB if the full interest name does not exist in the PIT.

* * * * *